INVENTOR
MORRIS KRAKINOWSKI

BY Ronald J. Kransdorf

ATTORNEY

March 11, 1969 M. KRAKINOWSKI 3,432,627

RECORD READING DEVICE

Filed Dec. 17, 1964 Sheet 4 of 4

United States Patent Office 3,432,627
Patented Mar. 11, 1969

3,432,627
RECORD READING DEVICE
Morris Krakinowski, Ossining, N.Y., assignor to International Business Machines Corporation, New York, N.Y., a corporation of New York
Filed Dec. 17, 1964, Ser. No. 419,028
U.S. Cl. 200—46 23 Claims
Int. Cl. H01h 43/08

ABSTRACT OF THE DISCLOSURE

A record reading device composed of a matrix of reed relays for reading a record having seelcted index positions which are opaque to a magnetic field in certain of the matrix positions. Reed relay energizing means maintains all of the relays in the matrix energized until said record is fully inserted in the device, whereupon a latch means engages the record for a predetermined period of time to insure accurate reading of said record before the record may be removed.

This invention relates to a device for reading a record of the type having a plurality of index positions, and more particularly to a device for reading such records which device is suitable for use as part of a data-collection system.

In an effort to improve the operation and record keeping of production organizations, numerous data-collection systems have been developed. One source of data for such systems is a unit record such as a personnel-identifying badge or a part-identifying card. The readers for these unit records are generally positioned at terminals situated throughout the production shop. The record is inserted into the reader by operating personnel and is scanned by the data-collecting system either periodically or in response to an indication from the terminal that it has data to transmit. Since the information, once placed in the system, is used for such critical functions as production planning, inventory control, and payroll records, the reader must be designed so as to minimize the possibility of erroneous information being entered into the system.

One of the chief causes of erroneous information being entered into the system is a malfunction of the reader itself. It is therefore important that the reader be as simple and reliable as possible so as to minimize the possibility of it malfunctioning. Since the reader is generally employed on the shop floor, the contacts contained therein should be sealed so as to prevent dirt and other contaminants in the atmosphere from affecting contact closure. It is also desirable that the reader be self-checking so that a malfunction of the reader may be detected by the data-collecting system and suitable remedial action taken. Since a variety of spurious codes are generated as a record is being inserted or removed from the reader, it is also important that the reader be designed so that reading only takes place when a record is fully and properly inserted.

A second source of erroneous information to the system is the incorrect operation of the reader by the opeartor. It is therefore important that the reader be designed to aid and guide the operator to follow the correct record insertion and removal procedure. The reader should therefore be designed to accept an inserted record when it is properly oriented, an improperly oriented record being ejected and returned to the operator. Also, since it takes a predetermined period of time for the data-collecting system to properly scan the record, it is important that the record not be prematurely removed. A latching mechanism should therefore be provided to prevent the record from being removed until it has been in the reader long enough for the necessary scanning operations to be compelted. It is also possible that the operator may neglect to fully insert the record into the reader. The reader should therefore be designed to function only when a record has been fully inserted and to eject a record which has not been fully inserted.

A third possible source of erroneous information is intentional malfeasance on the part of the opeartor. While it is not generally possible to render the reader absolutely tamper-proof, the precautions stated above for preventing negligent operation of the reader also serve to reduce the opportunities for intentional malfeasance.

Since a data-collecting system would normally employ numerous readers, it is important that the cost of the individual readers be as low as possible. Power supplies are one source of considerable expense, both initially and for maintenance, in terminal devices. It is therefore desirable that the reader be capable of performing all its functions without the need for an internal power supply or of any external energy except that of the opeartor himself.

It is therefore a primary object of this invention to provide a record-reading device which, when used as an input terminal of a data-collecting system, minimizes the probability of erroneous information being entered into the system.

A more specific object of this invention is to provide a record reader which inhibits the reading operation during the time period when a record is being either inserted or removed from the reader.

Another object of this invention is to provide a record reader which inhibits reading from taking place until and unless a record is properly seated in the reader.

Still another object of this invention is to provide a record reader which prevents an incorrectly oriented record from being inserted into it.

A further object of this invention is to provide a record reader which prevents premature removal of the record.

A still further object of this invention is to provide a record reader of the type described above which prevents some forms of malfeasance on the part of the operator from causing an erroneous reading.

Another object of this invention is to provide a record reader of the type described above which is self-checking.

A still further object of the invention is to provide a record reader of the type described above which is capable of performing all its functions without the need for an internal power supply or of any external energy except that of the operator himself.

Another object of this invention is to provide a record reader of the type described above which is capable of operating reliably even in a contaminated atmosphere.

In accordance with these objects, this invention provides a record reader for reading a record, selected index positions of which are opaque to a field of a particular type which includes a field-generating element and a field-responsive element. The record is inserted between these elements, causing selected portions of the field-responsive element to be deactivated. In a preferred embodiment of the invention, the field-generating element is a bank of permanent magnets, one for each index position in the record, the field-responsive element is a bank of reed switches, one for each magnet, and the record has low-reluctance material at selected index positions thereof. The leading edge of the record is deformed to coact with detent mechanism in the reader which prevents the record from being inserted unless it is properly oriented. A biasing magnet is provided which normally energizes all of the reed switches. When a record has been fully inserted, a latching mechanism is activated to hold the record in the reader and the biasing magnet is repositioned so as to no longer affect the setting of the reed switches. This enables the bank of permanent magnets to control the setting of the switches. A timing mechanism may also be provided which is started when the record is fully inserted. During the period that the timer is running, the operator may not remove the record. When the timer completes its cycle, the operator may, for example by pressing a lever, reset the timing mechanism, return the biasing magnet to its normal position, and unlatch the record, allowing it to be ejected from the reader.

The foregoing and other objects, features and advantages of the invention will be apparent from the following more particular description of a preferred embodiment of the invention, as illustrated in the accompanying drawings.

Figure 4A:
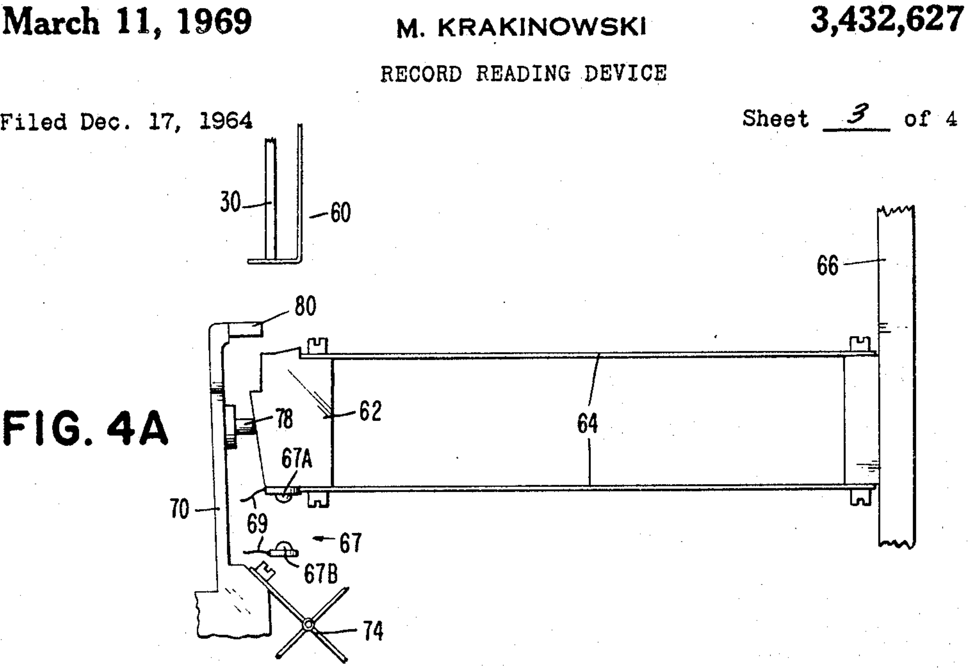
Figure 4B:
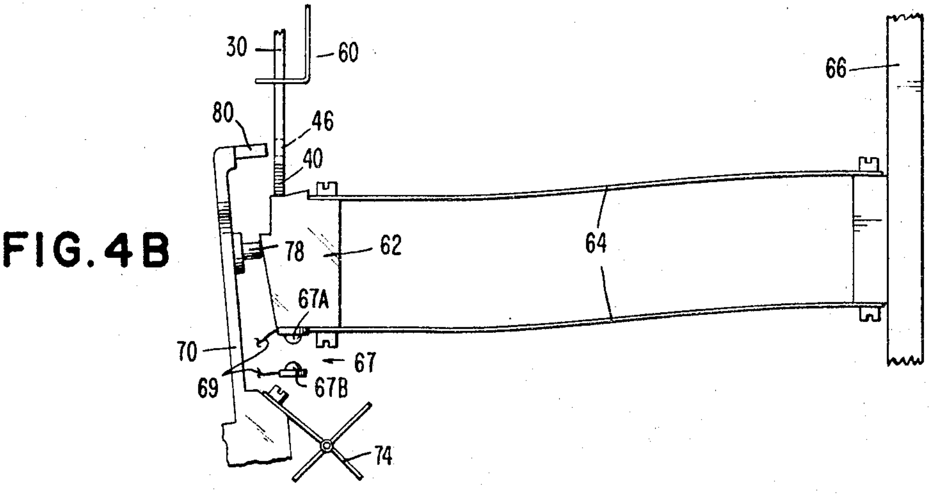
Figure 4C:
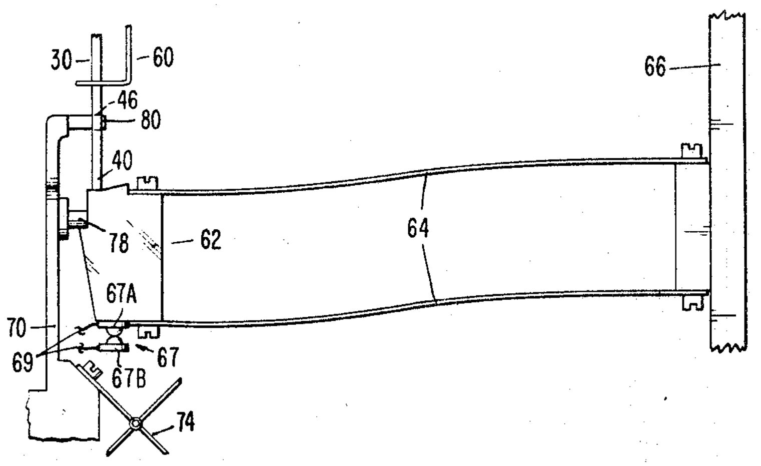

FIGS. 4A, 4B, and 4C are elevation views of the record latching mechanism of the invention shown in three possible positions.

Figure 5:
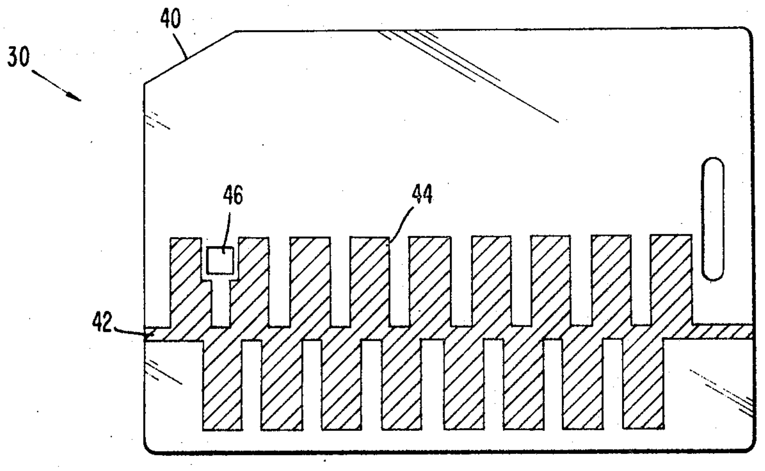

FIG. 5 is an illustration of a record suitable for use in a preferred embodiment of the invention.

Figures 6A, 6B, 6C:
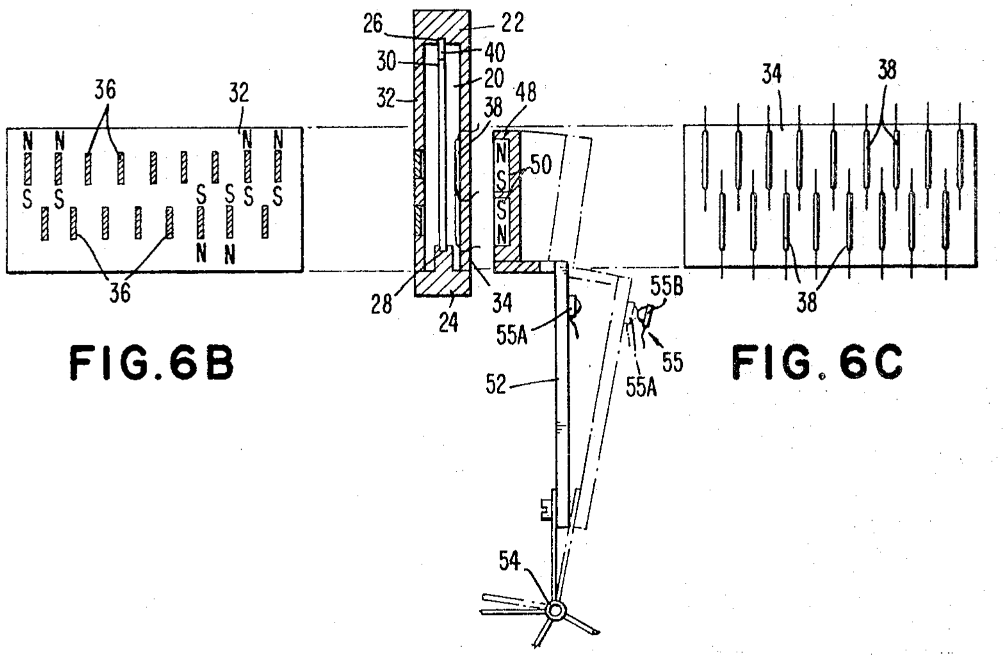

FIG. 6A is a rear view of the record reading mechanism of the preferred embodiment of the invention.

FIG. 6B is a side view of the bank of permanent magnets shown in FIG. 6A.

FIG. 6C is a side view of the bank of reed switches shown in FIG. 6A.

GENERAL DESCRIPTION

Since FIGS. 1, 2, 3, 4A–4C, and 6A–6C are all illustrations of the same embodiment of the invention, the following general description will be with reference to all these figures. Where appropriate, the figure in which an element is best illustrated will be pointed out.

Figure 3:
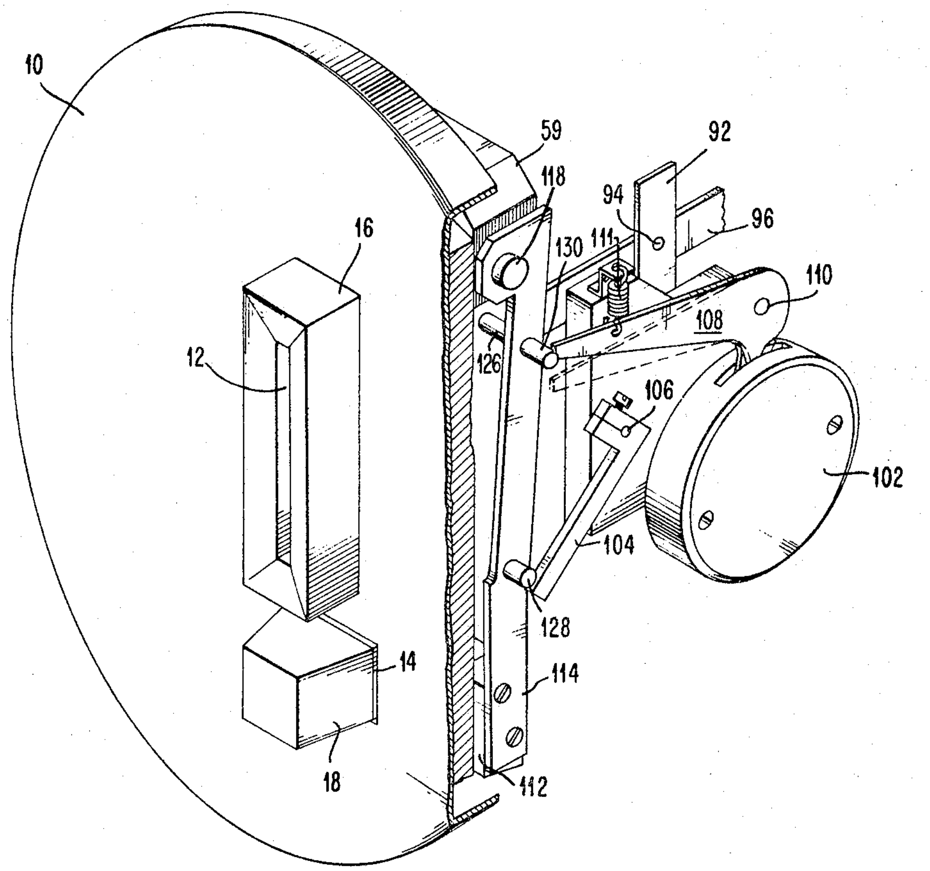
FIG. 3 is a partially cut-away front perspective view of the preferred embodiment of the invention.

Referring first to FIG. 3, it is seen that face plate 10 of the reader has a slot 12 for record insertion and an opening 14 formed therein. A record-guiding assembly 16 is positioned around slot 12. A reset button 18 projects through opening 14.

Figure 1:
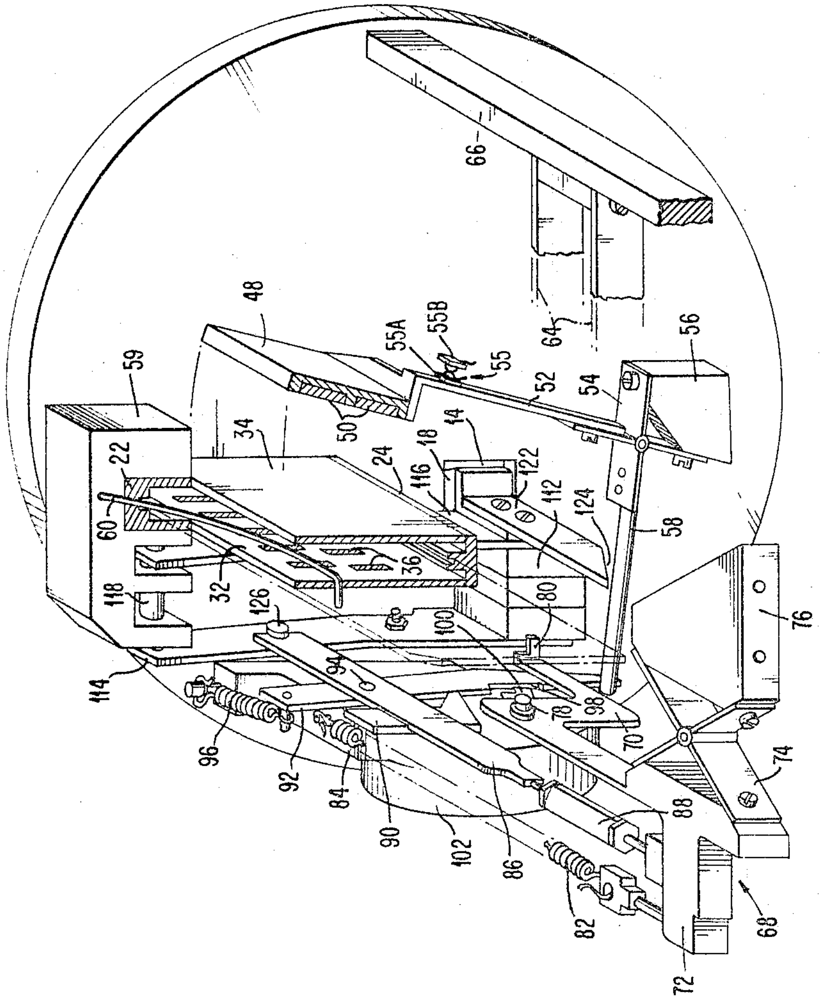
FIG. 1 is a partially cut-away rear perspective view of a preferred embodiment of the invention.

Referring now to FIGS. 1 and 6A, it is seen that a record guide channel 20 is formed on the other side of record-insertion slot 12. The upper portion of channel 20 is formed by frame member 22 and the lower portion of this channel by frame member 24. Frame member 22 has a track 26 formed in it, and lower frame member 24 has a track 28 formed in it. A record 30 is supported by these two tracks. The sides of channel 20 are formed by frames 32 and 34. Frame 32, which is best seen in FIG. 6B, has a plurality of permanent magnets 36 supported therein. These magnets are arranged in two rows with alternate magnets being in each row. The magnets are poled as shown in FIG. 6B. Frame 34, which is best seen in FIG. 6C, has a plurality of reed switches 38 supported thereon. There is a reed switch 38 for each permanent magnet 36, and these two sets of elements are arranged in an identical manner. Reed switches 38 are generally hermetically sealed so as to protect the contacts from contaminants in the atmosphere.

Referring to FIG. 5, it is seen that record 30 has a corner-cup 40 along its leading edge and has a strip 42 of low-reluctance material embedded therein. Strip 42 has a plurality of projections 44 which projections correspond in orientation to the previously described permanent magnets 36 (FIG. 6B) and reed switches 38 (FIG. 6C). The record code is set up by breaking off selected ones of the projections 44 before embedding strip 42 in the record. Record 30 also has a square cutout 46 formed in it near its leading edge. The portion of record 30 above strip 42 may contain printing, a picture, or other material commonly found on a badge or other record of that type.

Referring again to FIGS. 1 and 6A, it is seen that a frame 48 containing two large biasing magnets 50 is positioned adjacent to reed-containing frame 34. The polarity of the magnets 50 is shown in FIG. 6A. Frame 48 is mounted on arm 52, which arm is attached to flexure pivot 54. Flexure pivot 54 normally biases frame 48 to the position shown in FIG. 1 (the position shown dashed in FIG. 6A). A terminal 55A of bias magnet contact 55 is mounted on arm 52. Terminal 55B is fixedly mounted to contact terminal 55A when the bias magnets are in the position shown in FIG. 1. Referring specifically to FIG. 1, it is seen that flexure pivot 54 is mounted on support 56 and has an arm 58 projecting from it at a near-right angle to the arm 52.

Frame member 59 which has frame member 22 embedded in it has a detent arm 60 projecting from it. This arm normally projects through from member 22 into channel 20 but may be deformed to move into a recess (not shown) in frame member 22.

At the end of channel 20 is a hammer 62 (FIGS. 4A–4C) which is supported on two spring arms 64. Arms 64 are anchored to frame member 66, (also see FIG. 1). One terminal, 67A of a record-seated contact 67 is fixed to the rear of hammer 62. The other terminal, 67B, of this contact is fixedly positioned so as to enable the contact to be closed only when the record is seated (FIG. 4C). Leads 69 from terminals 67A and 67B feed the data collection system. An assembly 68 (FIG. 1) consisting of an arm 70 and a projection 72 at right angles to each other is mounted on a flexure pivot 74. Flexure pivot 74 is connected to frame member 76. Arm 70 has a stud 78 which rests on the upper surface of hammer 62 and a pin 80 which is adapted to coact with the rectangular hole 46 (FIG. 5) in record 30 to latch the record in the reader. The manner in which this is accomplished is described later. Assembly 68 is biased in a clockwise direction about flexure pivot 74 by spring 82. Spring 82 is connected at one end to projection 72 and at its other end to frame member 84.

Figure 2:
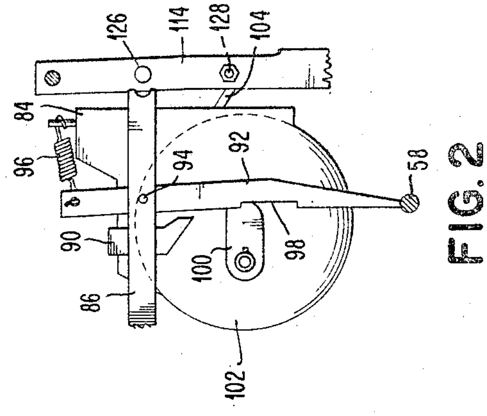
FIG. 2 is a side view of a portion of the mechanism shown in FIG. 1.

Projection 72 also has arm 86 connected to it through adjustable joint 88. Striker 90 is attached to arm 86. Referring particularly to FIG. 2, it is seen that striker 90 is adapted to strike lever 92, which lever is pivotally attached by pin 94 to arm 86. Lever 92 is biased in a clockwise direction around pin 94 by spring 96 which is attached at one end to the top of lever 92 and at the other end to frame member 84. Arm 58 is positioned under lever 92 when frame 48 is in the position shown in solid lines in FIG. 6A. Arm 92 has a notch 98 formed in it which, when the lever is in the position shown in FIG. 2, engages arm 100 of timing mechanism 102. Timer 102 may be any one of a variety of mechanical devices which is mechanically wound and takes a known period of time to then unwind. Arm 100 is attached to the winding mechanism so that the winding mechanism may not start unwinding as long as arm 100 is engaged by lever 92. Referring to FIG. 3, timing mechanism 102 is wound by rotating lever 104 in a counterclockwise direction about pin 106. Lever 108 projecting from timing mechanism 102 is normally biased in a clockwise direction about pivot 110 by spring 111 so as to be in the position shown in FIG. 3. When the timer is completely unwound, a striker (not shown) in timer 102 bears against the portion of lever 110 inside the timer, rotating lever 108 in a counterclockwise direction to the position shown in phantom lines in FIG. 3. The timer triggers the arm after a fixed delay. Arm 100 does not move gradually. Lever 108 remains in that position until the timer is rewound, at which time it is permitted to return to its normal position.

From FIGS. 1 and 3, it can be seen that reset button 18 is attached in part to base portion 112 of a reset assembly. Base portion 112 is sandwiched between arms 114 and 116. Arms 114 and 116 are connected to pivot about pin 118, which pin passes through frame assembly 59.

Arm 122, having camming surface 124, is connected to the outside of arm 116. Camming surface 124 is adapted to coact with arm 58 when reset button 18 is depressed to restore biasing-magnet frame 48 to the position shown in FIG. 6A. Arm 114 has a stud 126 projecting from its inner side which stud is adapted to coact with arm 86 when the reset button is depressed to move the arm in a backward direction, thereby causing assembly 68 to pivot in a counterclockwise direction about flexure pivot 74. From FIG. 3, it can also be seen that arm 114 has a stud 128 projecting from its outer side, which stud coacts with lever 104 to rewind timer 102 when reset button 118 is depressed. Arm 114 also has a stud 130 projecting from its outer side, which stud coacts with lever 108, when lever 108 is in its raised position (i.e. when the lever is in the position shown in solid lines in FIG. 3) to prevent reset button 18 from being depressed.

DESCRIPTION OF OPERATION

The reader is initially set as shown in FIGS. 2, 3, 4A, and 6A with timer 102 fully wound and held in its fully wound condition by arm 100 engaging slot 98 in lever 92. At this time, arm 58 is positioned under lever 92 causing biasing magnets 50 to be held (see FIG. 6A) in a position adjacent to reed switch assembly 34. Lever 108 is in the position shown in FIG. 3 and arms 64 are straight causing hammer 62 to be in the position shown in FIG. 4A. This causes arm 70 to be in a slightly raised position and arm 86 and striker 90 to be in the position shown in FIG. 2.

Assume first that the record inserted into the reader is not properly oriented so that corner-cut 40 (FIG. 5) is not oriented on the upper side of the leading edge. In this case, the leading edge of the record will engage arm 60 as shown in FIG. 4A and will be stopped thereby. Since only a small portion of the record is inserted into the reader before the record is stopped by arm 60, the operator is informed that he has inserted the record improperly. He may then remove it and try again.

Assume now that a properly oriented record is inserted in slot 12 (FIG. 3). When this occurs, arm 60 strikes the record along corner-cut 40 (FIG. 5) and rides up the corner cut into the recess (not shown) in frame assembly 22. The record then continues forward in channel 20 (FIG. 6A) until it strikes hammer 62. As the record is inserted further into channel 20, hammer 62 is moved back, as shown in FIG. 4B, against the action of spring arms 64. As hammer 62 is moved back, stud 78 rides up the inclined upper surface of the hammer. If the operator releases the record before it is fully inserted into the reader, hammer 62 returns to the position shown in FIG. 4A as a result of the spring action of spring arms 64 forcefully ejecting the record 30 from the reader. This indicates to the operator that he has improperly inserted the record and that he should try again.

It should be noted that since biasing magnets 50 (FIG. 6A) are positioned adjacent to reed switches 38 during the time perioid that a record is being inserted into the reader, all of these switches are maintained in their closed condition and the variations in the flux applied to these switches by magnets 36 as a result of the shunting effect of strip 42 during this period has not effect on these switches. Erroneous information is therefore not generated during this time period. Any attempt by the operator to confuse the reader by jiggling the badge back and forth therein is also without effect on the reed switches.

As may be seen from FIG. 4C, when a record is fully inserted into the reader, stud 78 drops down into the slot on the upper surface of hammer 62 detenting the hammer in its retracted position. Stud 78 dropping permits arm 70 to drop causing pin 80 to fall into hole 46 (FIG. 5) in record 30. This prevents the record from being removed from the reader once it has been fully inserted. From FIG. 4C, it can be seen that when hammer 62 is in this position, record-seated contact 67 is closed. Referring to FIG. 1, it is seen that when arm 70 moves down, it causes assembly 68 to pivot in a clockwise direction about flexure pivot 74 causing arm 86 and therefore striker 90 to both be moved in a forward direction. Striker 90 moving forward causes lever 92 to be rotated in a counterclockwise direction around pin 94 to the position shown in FIG. 1. When lever 92 is in the position shown in FIG. 1, it no longer holds arm 58 down and flexure 54 therefore moves arm 52 and biasing magnet frame 48 to the position shown in FIG. 1. With arm 52 in this position, bias magnet contact 55 is closed. Slot 98 is also moved away from arm 100, permitting timer 102 to begin its unwinding cycle.

It is assumed that selected ones of the projections 44 (FIG. 5) of strip 42 have been broken off so that some code is set up in record 30. When biasing magnets 50 are moved to a position where they no longer influence reed switches 38, only those reed switches which are in the magnetic field of a magnet 36 are maintained closed. Where a low-reluctance projection 44 in record 30 is situated between a magnet 36 and its corresponding reed 38, the magnetic field of this magnet is shunted by the projection 44, and the corresponding reed switch is permitted to open. At this point, another advantage of the biasing magnets 50 becomes apparent. Since it requires less magnetic energy to maintain a reed switch closed than to close it, and since magnets 36 need only maintain the switches closed, the closing being accomplished by magnets 50, low energy magnets 36 may be used. This permits closer spacing of the index positions on record 30 without the resulting danger of the magnet 36 from the index position influencing the reed switch 38 of another.

When the reed switches 38 are sampled by a data-collecting system, only such switches as are adjacent to index positions in the record not containing low-reluctance material are closed, resulting in a detectable code pattern. Since bias magnet contact 55 and record-seated contact 67 are also closed at this time, the data-collecting system may accept this information as being valid. A data-collection system suitable for use with the record reader of this invention is shown in co-pending applications, Serial Numbers 360,894 and 379,262, now U.S. Patents 3,362,013, issued Jan. 2, 1968, and 3,369,219 issued Feb. 13, 1968 entitled: "Sequential Switching Device" and "Sampling System for Binary Indicators Having Plural Sampling Rates," respectively, both filed on behalf of Abramson et al. and assigned to the assignee of the instant application.

It is assumed that the time required for timer 102 to unwind is slightly greater than the time required for a sufficient number of samples to be taken of the setting of reed switches 38 in order to assure an accurate reading of the record. While the timer is unwinding, lever 108 is in the position shown in solid lines in FIG. 3. It therefore bears against stud 130, preventing reset button 18 from being depressed. Record 30 is therefore locked in the reader during this time period and may not in any way be removed by the operator. This assures that the record is left in the reader for a sufficient period of time for an accurate reading to be taken. When timer 102 has completely unwound, a striker (not shown) bears against the portion of lever 108 which is inside timer 102, rotating lever 108 in a counterclockwise direction to the position shown in phantom lines in FIG. 3. When this occurs, the record may be removed from the reader. However, this does not automatically cause the record to be removed from the reader. For the record to be removed from the reader, the operator must first depress release button 18. So long as the operator does not depress release button 18, the record remains in the reader and continues to be read during each sampling cycle of the data-collection system.

When the operator depresses release button 18, a number of things occur. Stud 128 (FIG. 3) bears against lever 104, causing this lever to be rotated in a counterclockwise direction around pin 106. This causes timer 102 to be rewound. As soon as timer 102 starts to rewind, lever 108 is released. However, since stud 130 is positioned over lever 108 at this time, the lever cannot return to its normal position until pressure is removed from release button 18, permitting arms 114 and 116 to return to their normal positions. Camming surface 124 of arm 122 bears against arm 58, moving this arm downward, thereby causing arm 52 to be rotated in a counterclockwise direction about flexure pivot 54 to bring biasing magnets 50 into the position shown in FIG. 6A. As soon as arm 52 starts to move, bias magnet contact 55 is opened. This tells the data-collecting system that the reader is in a transition state and that readings should not be taken. But for this feature, erroneous readings could be taken as biasing magnets 50 moved toward reed switches 38 and started to energize them. Also, stud 126 bears against arm 86 (see FIG. 2), moving arm 86, and therefore striker 90 in a backward direction. This permits lever 92 to return, due to the action of biasing spring 96, to the position shown in FIG. 2, and causes assembly 68 to be rotated in a counterclockwise direction about flexure pivot 74. Assembly 68, moving in a counterclockwise direction, raises arm 70, moving stud 78 out of the slot in the upper surface of hammer 62 and withdrawing pin 80 from hole 46 in record 30. Hammer 62 is therefore free to return to its normal position shown in FIG. 4A causing record 30 to be ejected from the reader. When the timing mechanism has been completely rewound, arm 100 is in the position shown in FIG. 2 and again engages slot 98 in now properly positioned lever 92. Similarly, when bar 58 has been completely lowered, it is positioned under lever 92 and is detented in this position in the manner shown in FIG. 2. The reader is thus reset and ready to accept a new record to be read.

If release button 18 is not fully depressed, record 30 is not released and, when button 18 is released, the reader returns to the condition it was in when a record was first inserted with timer 102 partially wound and lever 108 in the position shown in solid lines in FIG. 3. The release button may not then be depressed again until timer 102 is again completely unwound.

It should be noted that while the reader is in its reset condition, bias magnet contact 55 and badge-seated contact 67 are open and biasing magnets 50 are positioned adjacent to reed switches 38 causing all of these switches to be in their closed condition. The sampling system continues to sample the reader during this period and if it should detect either the combination of badge-seated contact 67 being opened and one or more of the reed switches 38 also being opened, or the badge-seated contact blank being closed and all of the reed switches 38 being closed (this being an illegal record code), the system is alerted that there is a malfunction at the reader so that suitable remedial action may be initiated. The reader is therefore capable of being easily checked between readings so as to prevent the possibility of erroneous information being entered into the system.

It should also be noted that the judicious use of springs and permanent magnets has eliminated the need for any energy source in the reader or for any energy being applied to the reader except that supplied by the operator himself when he either inserts a record or depresses the reset button. This substantially reduces the cost and size of the reader and increases its reliability.

While in the preferred embodiment of the invention described above, arms 64 have been permitted to return to the unstressed condition shown in FIG. 4A, better ejection of the record may be achieved by placing a stop in the path of hammer 62 to stop it just short of the position shown in FIG. 4A. Also in the preferred embodiment of the invention, the insertion of an improperly oriented record into the system has been prevented by arm 60. However, if the record employed with the reader had an orientation cut-out in its leading edge rather than a corner cut, a device such as that shown in co-pending application, Serial Number 312,512, now U.S. Patent 3,239,217; issued March 8, 1966; entitled: "Transport Control Device" filed on behalf of W. M. Davis and assigned to the assignee of the instant application might be employed. While magnets 36 and 50 have been shown in FIGS. 1, 6A, and 6B, as being permanent magnets, it is apparent that where external energy may be used, electromagnets may be used in their stead. Likewise, while the sealed nature of reed switches 38 renders them ideally suited for high reliability operation, particularly in contaminated atmospheres, any suitable device which switches in response to a magnetic field might be used in their stead. A further modification of the reading device of the preferred embodiment of the invention is possible where a bilateral transmission line interconnects the record reader and a central station (not shown). In this case, timer 102 may be dispensed with and lever 108 moved to the position shown in phantom lines in FIG. 3 by, for example, an electro-magnet energized from the central station when the reading operation has been completed. Lever 108 could be mechanically latched in this position and released by the depressing of button 18. It is also possible with a bilateral transmission line to dispense with release button 18 and its related assembly and to both release the record and reset the reader under control of the central station.

Again, while in the preferred embodiment of the invention the reader has employed magnets and magnetic-field responsive devices to read a record containing low-reluctance material at selected ones of its index positions, it is within the contemplation of the invention to use any suitable field-generating and field-responsive devices where the nature of the record being read so requires. For example, with a suitable record, it may be necessary to use, in place of magnets 36 and 50, sources of electrostatic fields or light and, in place of reed switches 38, switches which operate in response to an electrostatic field or to light.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A device for reading a record, selected index positions of which are opaque to a field of a particular type, comprising:
means responsive to a field of said particular type;
means for energizing said responsive means;
means for permitting said record to be inserted between said energizing and said responsive means whereby selected portions of said responsive means are de-energized by the interrupting of the field from said energizing means by the opaque index positions of said record; and
timer means for maintaining said responsive means energized until said record has been fully inserted.

2. A device for reading a record, selected index positions of which are opaque to a field of a particular type, comprising:
means responsive to a field of said particular type;
means for energizing said responsive means;
means for permitting said record to be inserted between said energizing and said responsive means whereby selected portions of said responsive means are de-energized by the interrupting of the field from said energizing means by the opaque index positions of said record; and
means for preventing said record from being removed for a predetermined period of time after it has been inserted.

3. A device for reading a record, selected index positions of which are opaque to a field of a particular type, comprising:

means responsive to a field of said particular type;
means for energizing said responsive means;
means for permitting said record to be inserted between said energizing and said responsive means whereby selected portions of said responsive means are de-energized by the interrupting of the field from said energizing means by the opaque index positions of said record,
means for maintaining said responsive means energized until said record has been fully inserted; and
means for preventing said record from being removed for a predetermined period of time after it has been inserted.

4. A device for reading a record, selected index positions of which are of low reluctance material, comprising:
means responsive to magnetic lines of force;
means for energizing said responsive means;
means for permitting said record to be inserted between said energizing and said responsive means, whereby said energizing means is selectively shunted by said low reluctance material in said record, selectively de-energizing portions of said responsive means; and
means for maintaining said responsive means energized until said record has been fully inserted.

5. A device for reading a record, selected index positions of which are of low reluctance material, comprising:
means responsive to magnetic lines of force;
means for energizing said responsive means;
means for permitting said record to be inserted between said energizing and said responsive means, whereby said energizing means is selectively shunted by said low reluctance material in said record, selectively de-energizing portions of said responsive means; and
timer means for preventing said record from being removed for a predetermined period of time after it has been inserted.

6. A device for reading a record, selected index positions of which are of low reluctance material, comprising:
means responsive to magnetic lines of force;
means for energizing said responsive means;
means for permitting said record to be inserted between said energizing and said responsive means, whereby said energizing means is selectively shunted by said low reluctance material in said record, selectively de-energizing portions of said responsive means;
means for maintaining said responsive means energized unitl said record has been fully inserted; and
means for preventing said record from being removed for a predetermined period of time after it has been inserted.

7. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;
means for normally applying a biasing magnetic field to energize all of the field responsive elements in said bank of field responsive elements; and
means responsive to said record being fully inserted for eliminating the effect of said biasing-field generating means.

8. A device for reading a record, selected index positions of which are of low reluctance material, comprising:
a bank of magnetic field responsive elements, one for each index position of said record;

a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized; and
timer means for preventing said record from being removed from said device for a predetermined period of time after it has been inserted.

9. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;
a timing device which gives a detectable output a predetermined period of time after it is started;
means responsive to said record being fully inserted for latching said record in said reading device and for starting said timing device; and
means responsive to said detectable output from the timing device for permitting said record to be unlatched.

10. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;
means for normally applying a biasing magnetic field to energize all of the field responsive elements in said bank of field responsive elements;
means responsive to said record being fully inserted for eliminating the effect of said biasing-field generating means; and
means for preventing an improperly oriented record from being inserted into said device.

11. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;

means for normally applying a biasing magnetic field to energize all of the field responsive elements in said bank of field responsive elements;
means normally operating on a record inserted into said device for attempting to eject said record; and
means responsive to a record being fully inserted in said device for inhibiting the action of said ejecting means and for eliminating the effect of said biasing-field generating means.

12. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;
means for normally applying a biasing magnetic field to energize all of the field responsive elements in said bank of field responsive elements;
means normally operating on a record inserted into said device for attempting to eject said record;
a timing device which gives a detectable output a predetermined period of time after it is started;
means responsive to said record being fully inserted for inhibiting the action of said ejecting means, eliminating the effect of said biasing-field generating means, latching said record in said reading device, and starting said timing device; and
means responsive to said detectable output from said timing device for permitting the reapplying of said biasing field to said field responsive elements, the unlatching of said record, and the uninhibiting of said ejecting means whereby said record may be ejected from said reading device.

13. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;
means for normally applying a biasing magnetic field to energize all of the field responsive elements in said bank of field responsive elements; and
means responsive to said record being fully inserted for eliminating the effect of said biasing-field generating means and for generating a detectable output.

14. A device for reading a record, selected index positions of which are of low reluctance material, comprising:
a bank of magnetic field responsive elements, one for each index position of said record;
a bank of magnetic field generating elements, one for each of said index positions, each of said field generating elements being positioned to normally energize a selected one of said field responsive elements;
means for permitting said record to be inserted between said bank of field responsive elements and said bank of field generating elements whereby the field from each field generating element adjacent to an index position of low reluctance material in said record is shunted causing the corresponding field responsive element to be de-energized;
means for normally applying a biasing magnetic field to energize all of the field responsive elements in said bank of field responsive elements;
means normally operating on a record inserted into said device for attempting to eject said record;
a timing device which gives a detectable output a predetermined period of time after it is started;
means responsive to said record being fully inserted for inhibiting the action of said ejecting means, eliminating the effect of said biasing-field generating means, latching said record in said reading device, and starting said timing device;
reset means for reapplying said biasing field to said field responsive elements, for unlatching said record, and uninhibiting said ejecting means whereby said record may be ejected from said reading device;
means for inhibiting the operation of said reset means; and
means responsive to the detectable output from said timing device for removing the effect of said inhibiting means from said reset means.

15. A device for reading a record, selected index positions of which are of low reluctance material, comprising:
a bank of reed switches, one for each index position of said record;
a bank of permanent magnets, one for each of said reed switches, each of said magnets being positioned to normally energize a selected one of said reed switches;
means for permitting said record to be inserted between said bank of reed switches and said bank of magnets whereby the field from each magnet adjacent to an index position of low reluctance material in said record is shunted causing the corresponding reed switch to be de-energized;
a biasing magnet normally positioned to energize all the reed switches in said bank of reed switches; and
means responsive to said record being fully inserted for repositioning said biasing magnet so that its field no longer energizes said reed switches.

16. A device for reading a record, selected index positions of which are of low reluctance material, comprising:
a bank of reed switches, one for each index position of said record;
a bank of permanent magnets, one for each of said reed switches, each of said magnets being positioned to normally energize a selected one of said reed switches;
means for permitting said record to be inserted between said bank of reed switches and said bank of magnets whereby the field from each magnet adjacent to an index position of low reluctance material in said record is shunted causing the corresponding reed switch to be de-energized; and
timer means for preventing said record from being removed from said device for a predetermined period of time after it has been inserted.

17. A device for reading a record, selected index positions of which are of low reluctance material, comprising:
a bank of reed switches, one for each index position of said record;
a bank of permanent magnets, one for each of said reed switches, each of said magnets being positioned to normally energize a selected one of said reed switches;
means for permitting said record to be inserted between said bank of reed switches and said bank of magnets whereby the field from each magnet adjacent to an index position of low reluctance material in said record is shunted causing the corresponding reed switch to be de-energized;
a biasing magnet normally positioned to energize all the reed switches in said bank of reed switches;
means responsive to said record being fully inserted for repositioning said biasing magnet so that its field no longer energizes said reed switches and for latching said record in said reading device; and means for returning said biasing magnet to its normal position and for unlatching said record.

18. A device for reading a record, selected index positions of which are of low reluctance material, comprising:

a bank of reed switches, one for each index position of said record;

a bank of permanent magnets, one for each of said reed switches, each of said magnets being positioned to normally energize a selected one of said reed switches;

means for permitting said record to be inserted between said bank of reed switches and said bank of magnets whereby the field from each magnet adjacent to an index position of low reluctance material in said record is shunted causing the corresponding reed switch to be de-energized;

a timing device which gives a detectable output a predetermined period of time after it is started;

means responsive to said record being fully inserted for latching said record in said reading device and for starting said timing device; and means responsive to said detectable output from the timing device for permitting said record to be unlatched.

19. A device for reading a record, selected index postions of which are of low reluctance material, comprising:

a bank of reed switches, one for each index position of said record;

a bank of permanent magnets, one for each of said reed switches, each of said magnets being positioned to normally energize a selected one of said reed switches;

means for permitting said record to be inserted between said bank of reed switches and said bank of magnets whereby the field from each magnet adjacent to an index position of low reluctance material in said record is shunted causing the corresponding reed switch to be de-energized;

a timing device which gives a detectable output a predetermined period of time after it is started;

a biasing magnet normally positioned to energize all the reed switches in said bank of reed switches;

means responsive to said record being fully inserted for latching said record in said reading device, for starting said timing device, and for repositioning said biasing magnet so that its field no longer energizes said reed switches; and means responsive to said detectable output from the timing device for permitting said record to be unlatched and for permitting said biasing magnet to be returned to its normal position.

20. A device of the type described in claim 19, including:

means for preventing an improperly oriented record from being inserted into said device.

21. A device for reading a record, selected index positions of which are of low reluctance material, comprising:

a bank of reed switches, one for each index position of said record;

a bank of permanent magnets, one for each of said reed switches, each of said magnets being positioned to normally energize a selected one of said reed switches;

means for permitting said record to be inserted between said bank of reed switches and said bank of magnets whereby the field from each magnet adjacent to an index position of low reluctance material in said record is shunted causing the corresponding reed switch to be de-energized;

a timing device which gives a detectable output a predetermined period of time after it is started;

a biasing magnet normally positioned to energize all the reed switches in said bank of reed switches;

means responsive to said record being fully inserted for latching said record in said reading device, for starting said timing device, and for repositioning said biasing magnet so that its field no longer energizes said reed switches;

a reset assembly;

means operable in response to the operation of said reset assembly for unlatching said record and returning said biasing magnet to its normal position;

means for normally preventing said reset assembly from being operated; and means responsive to the detectable output from said timing device for permitting said reset assembly to be operated.

22. A device for reading a record, selected index positions of which are of low reluctance material, comprising:

a bank of reed switches, one for each index position of said record;

a bank of permanent magnets, one for each of said reed switches, each of said magnets being positioned to normally energized a selected one of said reed switches;

means for permitting said record to be inserted between said bank of reed switches and said bank of magnets whereby the field from each magnet adjacent to an index position of low reluctance material in said record is shunted causing the corresponding reed switch to be de-energized;

a spring-supported hammer in the path of travel of said record, said hammer being operable, when displaced by an inserted record, to eject the record if the record should be released;

a timing device which gives a detectable output a predetermined period of time after it is started;

a biasing magnet normally positioned to energize all the reed switches in said bank of reed switches;

means responsive to said record being fully inserted for latching said hammer so as to prevent it from ejecting said record, for latching said record in said reading device, for starting said timing device, and for repositioning said biasing magnet so that its field no longer energizes said reed switches; and means responsive to said detectable output from the timing device for permitting said hammer to be unlatched and said record to be unlatched, whereby said record may be ejected from said reading device, and for permitting said biasing magnet to be returned to its normal position.

23. A device for reading a record, selected index positions of which are of low reluctance material, comprising:

a bank of reed switches, one for each index position of said record;

a bank of permanent magnets, one for each of said reed switches, each of said magnets being positioned to normally energize a selected one of said reed switches;

means for permitting said record to be inserted between said bank of reed switches and said bank of magnets whereby the field from each magnet adjacent to an index position of low reluctance material in said record is shunted causing the corresponding reed switch to be de-energized;

a spring-supported hammer in the path of travel of said record, said hammer being operable, when displaced by an inserted record, to eject the record if the record should be released;

a timing device which gives a detectable output a predetermined period of time after it is started;

a biasing magnet normally positioned to energize all the reed switches in said bank of reed switches;

means responsive to said record being fully inserted for latching said hammer so as to prevent it from ejecting said record, for latching said record in said reading device, for starting said timing device, and for repositioning said biasing magnet so that its field no longer energizes said reed switches;

a reset assembly;

means operable in response to the operation of said reset assembly for unlatching said hammer and unlatching said record, whereby said record may be ejected from said reading device, and for permitting said biasing magnet to be returned to its normal position;

means for normally preventing said reset assembly from being operated; and means responsive to the detectable output from said timing device for permitting said reset assembly to be operated.

References Cited

UNITED STATES PATENTS 3,274,352 9/1966 Ryno et al. ______ 340—149 X

ROBERT K. SCHAEFER, *Primary Examiner.*

D. SMITH, Jr., *Assistant Examiner.*

U.S. Cl. X.R.

235—61.11